June 17, 1941.   A. K. LYLE   2,246,375
METHOD OF AND APPARATUS FOR FEEDING BATCH TO GLASS MELTING FURNACES
Filed Nov. 25, 1939
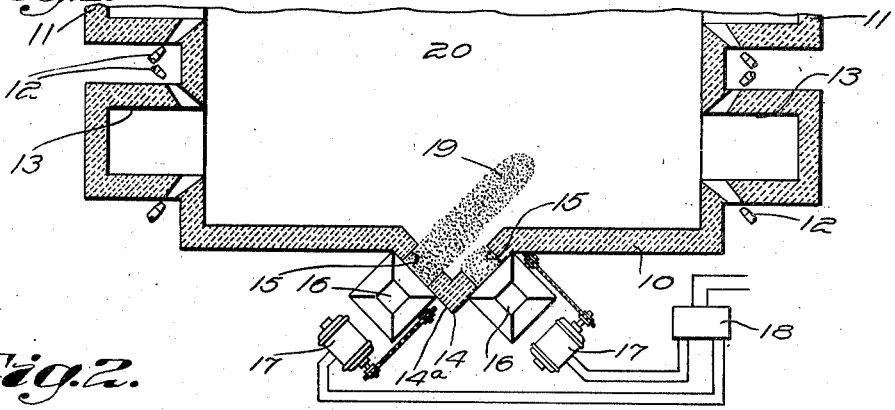
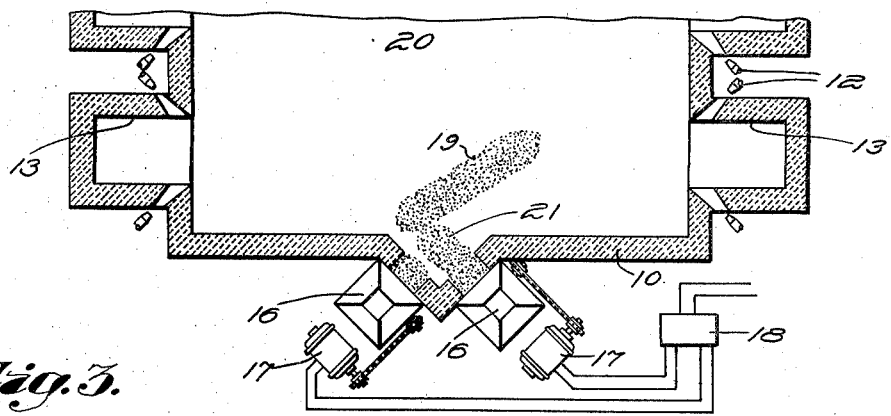
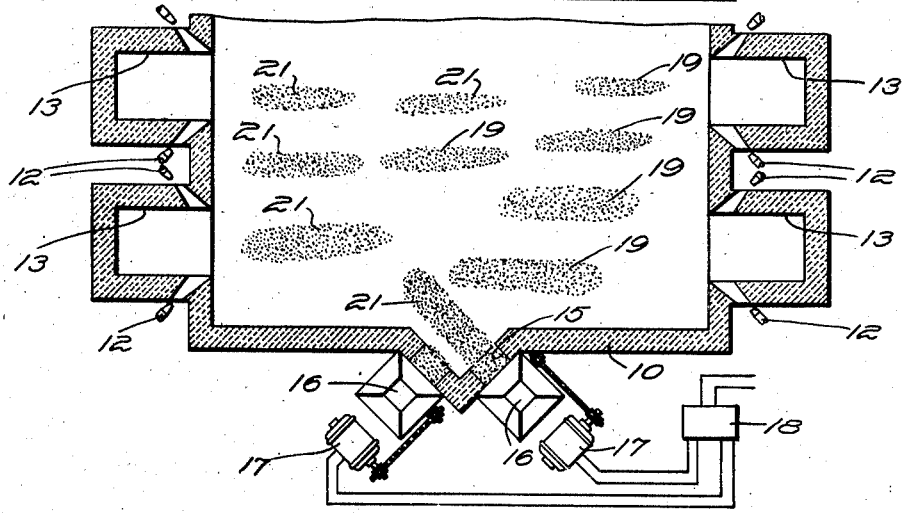
Inventor
Aaron K. Lyle
By Brown + Parham
Attorneys
Witness
W. B. Thayer Patented June 17, 1941

2,246,375

UNITED STATES PATENT OFFICE 2,246,375

METHOD OF AND APPARATUS FOR FEEDING BATCH TO GLASS MELTING FURNACES

Aaron K. Lyle, West Hartford, Conn., assignor to Hartford-Empire Company, Hartford, Conn., a corporation of Delaware Application November 25, 1939, Serial No. 306,129

10 Claims. (Cl. 49—54)

This invention relates to methods of and apparatus for feeding batch to glass melting furnaces.

Glass melting furnaces ordinarily are supplied with batch from doghouses through which the batch is fed to the melting end portions of such furnaces. It is usual, particularly in the case of a furnace in which glass is being made continuously, to make use of an automatic batch feeder to feed batch from a hopper or other source of supply to and through each such doghouse onto the surface of the body of molten glass or glass bath at the rear or a side of the glass melting end portion of the furnace. In practice, batch thus fed through a doghouse generally will form a connected relatively narrow elongate mass or stream of batch on the surface of the glass bath, extending in a substantially straight line either across the bath or longitudinally thereof, depending on the direction taken by such elongate mass or stream at an early stage of its formation. If this direction is longitudinal of the furnace, the connected elongate mass or stream of batch may extend too far on the glass bath toward the refining end of the furnace for desirable glass melting and refining operations in such furnace. If the direction is transverse of the bath, an excessive amount of relatively cold batch may accumulate and interfere with proper conditions in the glass next to the rear or end wall of the furnace.

An object of the present invention is to provide a method of and apparatus for feeding batch to the melting end of a furnace in such manner and by such means as more dependably to assure desirable distribution of the batch on the glass bath in the melting portion of the furnace.

A further object of the invention is to provide a method of and means for feeding batch through a doghouse to the melting end of a furnace so as to produce a series of separate quotas or masses of batch which alternately are distributed on the glass bath to the opposite sides of a line extending from the center of the doghouse longitudinally of the glass melting furnace, whereby to provide substantially regularly spaced widely distributed or dispersed masses or quotas of batch on the bath in the melting end portion of the furnace.

A further object of the invention is to obviate the production on the glass bath in the melting end of a furnace of a stream or elongate mass of batch of excessive and objectionable length.

A further object of the invention is to provide a method of and apparatus for feeding batch through a single doghouse in alternately produced floating masses which are projected from the doghouse on the glass bath in directions which intersect each other at an angle which preferably is approximately 90° but which may be somewhat greater or less.

A still further object of the invention is the provision of a novel and improved form of furnace doghouse.

In carrying out the present invention, I may provide at the rear of the melting end portion of a glass melting furnace a doghouse having a pair of substantially vertical side walls which respectively are symmetrically located in relation to a line extending from the center of the doghouse longitudinally of the furnace and in vertical planes which intersect each other at the rear of the glass melting furnace at an angle which preferably is approximately 90° but which may be somewhat greater or less. An automatic batch feeder of a type that is adapted to have alternating periods of activity and inactivity, each of predetermined duration, may be operatively associated with each of these side walls. Each such batch feeder may be operated to feed batch through a port in the associate wall or over the upper edge thereof into and through the doghouse for a predetermined period and then to remain inactive while the batch feeder associated with the other side wall is active to perform a like function.

Each batch feeder will produce during its period of activity an elongate mass of partly fused batch which will be projected from the doghouse on the bath in the melting end portion of the furnace in a direction approximately diagonal to the direction of length of the furnace. After the first batch feeder becomes temporarily inactive at the conclusion of a period of activity, the batch mass produced by the second batch feeder will intersect the path of the batch mass previously produced by the first batch feeder and will break its connection with the batch in the doghouse by pushing the rearward end portion of the first batch mass from the doghouse in a direction preferably extending at substantially a right angle with the direction of length of the first batch mass. The continued periodic operations of these batch feeders thus will produce series of spaced floating masses of partly fused batch on the surface of the bath at opposite sides of the longitudinal line extending from the center of the doghouse longitudinally of the melting furnace. The longitudinal axis of each such mass may be disposed at approximately a right angle with the direction of length of the furnace at the time such mass is disconnected from the succeeding mass of batch. The separate masses of batch will float on the glass bath longitudinally of the tank furnace, each being gradually reduced in size as complete fusion thereof takes place until all the batch of each mass has been completely melted and merged with the glass of the bath.

Other objects, advantages and features of the invention will hereinafter be pointed out or will become apparent from the following description of a practical embodiment of the invention as illustrated in the accompanying drawing, in which:

Fig. 1 is a fragmentary plan view of the melting end portion of a glass melting furnace having a doghouse and associate batch feeders located at the rear end of the furnace and adapted for use to perform the method of the invention, the view showing the condition of batch feeding at an early stage in the operations of the apparatus shown;

Fig. 2 is a view similar to Fig. 1 but showing conditions at a slightly later stage of operations of the apparatus; and Fig. 3 is a view similar to the preceding views but showing conditions after repeated periodic alternating batch feeding operations of the two batch feeders.

The melting end portion of the furnace shown in the drawing has a rear wall 10 and side walls 11. The firing may be alternately from opposite sides, as by the use of burners 12 and ports 13 in accordance with known practice in the operation of a regenerative furnace, or any other suitable known way of or means for applying the requisite heat to the glass bath and batch in the furnace may be employed.

The rear wall 10 may be provided at a place approximately intermediate the width of the furnace with a doghouse which is indicated generally at 14. This doghouse structure has a pair of substantially vertical side walls 14a which respectively are located at opposite sides of and symmetrically with relation to a line that extends from the center of the doghouse longitudinally of the furnace. In the particular doghouse structure shown, the side walls 14a join each other at an angle of approximately 90° and are provided with batch inlet ports 15.

It will be noted that the doghouse side walls 14a form obtuse angles at their inner ends with the portions of the furnace wall 10 to which they are joined (integrally or otherwise) and that the outlet from the doghouse to the interior of the furnace proper is relatively wide in relation to the width of the interior of the outwardly extending portion of the doghouse. These features are of advantage, particularly in that no sharp corners are provided in contact with the glass in the furnace and no obstruction is offered to the movement of a stream or elongate mass of batch from the doghouse diagonally toward either of the side walls of the furnace.

An automatic batch feeder 16 is operatively associated with each of the batch inlet ports 15. I prefer to use an automatic batch feeder of the type disclosed in Patent No. 1,941,897, granted to E. O. Hiller, assignor to Hartford-Empire Company, on January 2, 1934, although any other suitable automatic batch feeder may be used. Each batch feeder should, however, be adapted for use so as to be active while the other batch feeder is inactive and vice versa. As shown diagrammatically in the drawing, each batch feeder is provided with its individual operating mechanism, comprising an electric motor 17, operatively connected with the batch feeder. An electrical control mechanism, indicated diagrammatically at 18, is connected with these motors so that each motor will be operated for a period of predetermined duration while the other motor is inactive. It is unnecessary to illustrate or describe these electrical devices further as they are well known and may be readily provided by those skilled in the art should their use be desired. They do not, per se, form part of the present invention.

As shown in Fig. 1, the left-hand batch feeder 16 has produced an elongate mass or stream 19 of batch, extending from the doghouse on the glass bath 20 in the furnace diagonally toward the right hand wall 11 of the furnace.

In Fig. 2, the left-hand batch feeder is inactive and the right-hand batch feeder is active and has started the formation of a similar elongate mass of batch indicated at 21, which is being projected diagonally toward the left-hand furnace wall 11 so as to swing the extreme rearward end portion of the elongate batch mass 19 in a generally forward direction. In Fig. 3, a complete elongate mass 21, produced by the right-hand batch feeder, is shown projecting from the doghouse diagonally toward the left-hand furnace wall 11 while the immediately preceding elongate batch mass 19, produced by the left-hand batch feeder, is shown disconnected from the succeeding mass 21 and floating on the glass bath in the right-hand portion of the melting end of the furnace. Other batch masses 19 and 21, which were produced as the result of prior periodic alternating operations of the batch feeders, also are shown in Fig. 3, floating on the glass bath at different distances from the doghouse in the right-hand and left-hand portions, respectively, of the melting end of the furnace. It will be noted that the size of these masses has decreased as they traveled on the glass bath away from the doghouse and that their longitudinal axes are approximately at right angles with the direction of the length of the furnace and with the main direction of movement of such masses. These masses will be completely melted and merged with the glass of the bath before they have passed from the zone of the furnace in which it is desired to complete the batch melting function of the furnace.

By the use of the present invention, the batch fed to the melting end of the furnace is broken up at or near the juncture of the supply doghouse with the furnace proper into separate masses of suitable size which are distributed in the melting end portion of the furnace close to the rear end of the latter so that the fusion of the batch and its assimilation by the glass bath in the furnace may be effected in the melting end of such furnace in such manner and at such places as to tend to produce glass of uniform quality by the operation of the furnace.

The doghouse structure may vary in configuration and details from that shown. Instead of the side walls thereof coinciding in horizontal sectional configuration with the legs of a right-angled triangle, as shown, they may coincide substantially with the legs of a wider-angled or narrower-angled triangle or with similar portions of an arcuately curved or any other suitable geometric figure. Such walls may be provided with batch inlet ports or the feeding of the batch may be over the upper edges thereof, particularly if the doghouse is uncovered.

The paths of the alternately produced batch masses from the batch feeders into the furnace should intersect either within the doghouse, at the juncture of the doghouse with the furnace proper or in the furnace sufficiently close to the doghouse to assure the production and lateral distribution of separate floating masses of batch in the melting end portion of the furnace substantially as have been described. In the case of a relatively wide furnace, a plurality of similar doghouses or equivalent structures, each having two batch feeders associated therewith substantially as described, may be provided and respectively located at regularly spaced intervals along the rear wall of the furnace. Other changes in and modifications of the embodiment of the invention that has been illustrated in the accompanying drawing and described herein may be made without departing from the spirit and scope of the invention.

What I claim is:

1. The method of feeding batch to a glass melting furnace which comprises feeding batch intermittently through a doghouse into the melting end portion of the furnace in a series of discontinuous angularly related separate elongate masses alternately disposed at opposite sides of a line extending from the center of the doghouse longitudinally of the furnace.

2. The method of feeding batch to a glass melting furnace which comprises feeding batch through a doghouse at the rearward end of the furnace alternately along two angularly convergent paths which meet and cross each other at a point adjacent to the line of juncture of the doghouse with the rear end of the furnace proper so that batch fed periodically along each of said paths will be effective to break at spaced intervals the continuity of the stream or elongate mass of batch fed along the other of said paths.

3. The method of feeding batch to a glass melting furnace comprising feeding batch intermittently through a doghouse at the rear end of the furnace in a series of elongate masses alternately extending from different portions of the doghouse into the melting end portion of the furnace in directions intersecting each other at an angle of approximately 90° and separating each such mass at its rearward end from batch in the doghouse by the contact therewith of the forward end of the succeeding elongate mass.

4. The method of feeding batch to a glass melting furnace which comprises feeding batch into the melting end of the furnace at a batch feed point at the rear end of said furnace to produce an elongate connected mass of batch of predetermined length extending on the surface of the glass bath in the furnace in a line of feed approximately diagonal to the direction of length of the furnace, discontinuing temporarily feed of batch at said batch feed point, feeding batch at a second batch feed point adjacent to said first named batch feed point in a second elongate connected mass extending at approximately a right angle with said first named mass of batch and contacting with the latter to break it loose from the batch at its point of origin, discontinuing temporarily feed of batch at said second named batch feed point when the elongate mass of batch extending therefrom across the line of feed from the first named batch feed point has attained the length desired, resuming feed at the first named batch feed point to produce a further elongate mass like the first named mass and effective during its formation to break the second named mass of batch loose from the batch at its point of origin, and repeating in the order stated the subsequent operations herein described.

5. Apparatus for feeding batch to a glass melting furnace comprising a furnace doghouse having side walls lying in outwardly convergent substantially vertical planes, and batch feeding devices associated with said side walls and positioned to direct the batch into the doghouse in inwardly converging directions.

6. In apparatus for feeding batch to a glass melting furnace, a doghouse having side walls joined at their inner ends to a substantially vertical wall of the furnace and meeting at their outer ends at an angle of approximately 90° with each other, and batch feeding devices associated with said side walls and positioned to direct batch into the doghouse in inwardly converging directions.

7. Apparatus for feeding batch to a glass melting furnace comprising a doghouse having a pair of side walls lying in outwardly convergent substantially vertical planes, and separate batch feeding devices associated with said side walls for feeding batch through the doghouse to the interior of the furnace along paths which intersect each other at a point adjacent to the line of juncture of the doghouse with the furnace.

8. Apparatus for feeding batch to a glass melting furnace comprising a doghouse having a pair of side walls lying in outwardly convergent substantially vertical planes, separate batch feeding devices associated with said side walls for feeding batch through the doghouse to the interior of the furnace along paths which intersect each other at a point adjacent to the line of juncture of the doghouse with the furnace, each of said batch feeding devices being adapted to feed batch through the doghouse for a period of predetermined duration and then to be inactive for a further period, and means for controlling the operations of said batch feeding devices to cause the periods of batch feeding activity of the respective batch feeding devices to alternate each with respect to the other.

9. Apparatus for feeding batch to a glass melting furnace comprising a doghouse structure located at the rear end of the furnace and having a pair of batch feed ports located relatively to each other and to the rear end wall of the furnace to cause their axial lines to intersect each other in the furnace at a point adjacent to the extreme rearward end of said furnace, and separate feeding devices associated with said ports for feeding batch therethrough into said furnace.

10. Apparatus for feeding batch to a glass melting furnace comprising a doghouse structure located at the rear end of the furnace and having a pair of batch feed ports located relatively to each other and to the rear end wall of the furnace to cause their axial lines to intersect each other in the furnace at a point adjacent to the extreme rearward end of said furnace, and separate feeding devices associated with said ports for feeding batch therethrough into said furnace along paths which intersect each other at or adjacent to the point of intersection of the axial lines of said ports, each of said feeding devices being adapted to feed batch through its associate port into the furnace during a period of inactivity of the other batch feeding device and to be inactive during a period of batch feeding activity of the latter.

AARON K. LYLE.